United States Patent [19]

Westhoff et al.

[11] Patent Number: 4,746,127
[45] Date of Patent: May 24, 1988

[54] ADJUSTABLE CLAMPING BAND FOR GASKETS AND METHOD FOR USING SAME

[75] Inventors: James Westhoff, Langhorne; James A. Kelly, Warrington, both of Pa.

[73] Assignee: A-Lok Products, Inc., Tullytown, Pa.

[21] Appl. No.: 87,522

[22] Filed: Aug. 20, 1987

Related U.S. Application Data

[63] Continuation-in-part of Ser. No. 68,562, Jun. 30, 1987.

[51] Int. Cl.[4] .............................................. F16J 15/52
[52] U.S. Cl. ........................................ 277/1; 277/101; 277/207 A; 277/212 FB; 24/20 TT; 24/580; 285/237; 285/258; 52/20
[58] Field of Search .............. 277/1, 101, 165, 166, 277/186, 207 R, 207 A, 212 FB, DIG. 2; 52/20; 285/110, 230, 258, 231, 232, 260, 237, 345; 24/20 TT, 484, 580, 584, 585

[56] References Cited

U.S. PATENT DOCUMENTS

| | | | |
|---|---|---|---|
| 1,768,392 | 6/1930 | Benien | 24/585 X |
| 3,449,916 | 6/1969 | Tabor | 52/20 X |
| 3,958,313 | 5/1976 | Rossborough | 285/237 X |
| 4,281,944 | 8/1981 | Bowman | 52/20 X |
| 4,387,900 | 6/1983 | Ditcher et al. | 277/101 |
| 4,466,219 | 8/1984 | Campolito | 52/20 |
| 4,478,437 | 10/1984 | Skinner | 277/207 A X |
| 4,582,450 | 4/1986 | Neil | 52/20 X |

Primary Examiner—Robert S. Ward
Attorney, Agent, or Firm—Louis Weinstein

[57] ABSTRACT

A clamping band for clamping a resilient gasket against an opening within a wall to provide a fluid-tight seal therebetween. The clamping band is generally circular-shaped and has an elongated slot extending inwardly from one free end of the clamping band and cooperates with an elongated projection of reduced cross section as compared with the nominal cross section of the clamping band and which is provided at the opposite end of the band. The projection is inserted into the slot, the clamping band is placed against the gasket arranged within the aforesaid opening and the gasket is expanded a predetermined amount by an hydraulic expander to exert the desired clamping pressure upon the resilient gasket. One surface of the projection is provided with a series of teeth. An opening communicating with said slot receives a wedge fitted into said opening and having several teeth along one surface thereof, which teeth conform to the teeth of said projection. Insertion of the wedge inter-engages the teeth of the projection and the wedge locking the clamping band in the desired position with the requisite amount of the clamping pressure. The wedge is preferably tapped into the locking position and is also removable for whatever purpose and is reusable. The teeth may be replaced with openings in opposite sidewalls of the slot and in the projection. The insert is replaced by drive pins inserted into cooperating openings in the projection and sidewalls.

24 Claims, 6 Drawing Sheets

ADJUSTABLE CLAMPING BAND FOR GASKETS AND METHOD FOR USING SAME

This application is a continuation in part of application Ser. No. 068,562 filed June 30, 1987.

FIELD OF THE INVENTION

The present invention relates to clamping bands for clamping one end of a resilient gasket into an opening and more particularly to a clamping band of novel design which permits the mass production of clamping bands without great concern for sizing of the clamping bands.

BACKGROUND OF THE INVENTION

Applications exist wherein it is necessary to provide clamping means for clamping one end of a resilient gasket into an opening. For example, considering U.S. Pat. No. 4,387,900 assigned to the Assignee of the present invention, there is disclosed therein a gasket intended for use in an opening in manhole bases and the like wherein the gasket disclosed therein is intended for in situ installation within the openings of manhole bases which have either been precast at the factory or cored either at the factory or at a job site. The gasket is provided with an outer flange which is urged in an outward radial direction by a clamping band, which, in the clamped position, places the gasket under compression to effect a fluid-tight seal between the gasket and the opening in the manhole base. The inner end of the gasket forms a watertight seal with a pipe extended therethrough.

The clamping band described in U.S. Pat. No. 4,387,900 is a plastic band which is presized preparatory to delivery at the job site and is provided with a small insert portion hingedly connected to one of the free ends of the clamping band. The clamping band is expanded by suitable hydraulic expansion apparatus, the wedge is moved into the gap between the two free ends of the clamping band and the expansion force exerted on the clamping band is released to maintain the clamping band in the locked position.

Clamping bands of the above design suffer from a number of disadvantages which include the difficulty in insertion of the insert member and the inability of the clamping band to compensate for deviations in the nominal diameter of the opening formed in the manhole base. The latter problem is quite prevalent when dealing with manhole bases in which the openings have been cored due to the fact that the coring members, after undergoing wearing, tend to core openings which are smaller in diameter by a significant amount compared with the openings which are cored with new coring equipment.

An improvement in the clamping band has been introduced by virtue of pending application Ser. No. 778,690 filed Sept. 23, 1985 and assigned to the Assignee of the present invention. In the clamping band described in the aforementioned copending application, the hingedly mounted insert has been eliminated and the free ends of the clamping band butt together when the band has been suitably expanded and the expansion forces have then been released after the free ends have snapped outwardly and into engagement with one another. Although this design eliminates the problems introduced by the hingedly mounted insert, the critical sizing problem remains unresolved.

In addition to the above mentioned problems, it is also desirable to provide a clamping band which, although providing excellent clamping and compressive forces when properly mounted, is nevertheless easily removable and reusable.

BRIEF DESCRIPTION OF THE INVENTION

The present invention is characterized by providing a novel clamping band which overcomes all of the disadvantages of the prior art and is characterized by comprising a clamping band having an elongated slot extending inwardly from one free end thereof and having a projection whose cross-section is of reduced size as compared with the nominal cross section of the clamping band, said projection extending inwardly a predetermined distance from the opposite end of the clamping band.

The projection is provided with a plurality of successively aligned teeth along one surface thereof while the opposite end of the clamping band is provided with an opening which communicates with the aforementioned slot.

The manner in which the clamping band is installed is by slidably inserting the projection into the slot which freely slidably accepts said projection. Thereafter, the clamping band is placed within the recess provided in the flange of the gasket to be expanded against an opening in a manhole base, for example, which opening may be of either the precast or cored type.

A pair of shoulders provided along the inner concave surface of the clamping band receive a pair of projections of an expander assembly, which projections are moved apart, typically by hydraulic means, to expand the circumference of the clamping band. The hydraulic expanding apparatus is preferably provided with a suitable gage which, upon reaching a desired pressure value, is maintained at that pressure while a wedge having a shape conforming to the aformentioned opening and having several teeth provided in one surface of said wedge, is inserted into said opening to bring the teeth of the wedge into inter-engagement with associated teeth provided along one surface of the clamping band projection. The wedge is preferably firmly tapped in position, the expansion forces are removed from the clamping band and the expanding apparatus is removed from the gasket assembly. The wedge firmly retains the band in the clamped position. The wedge may be removed, if desired, to remove and/or replace the re-usable clamping band.

In still another preferred embodiment of the present invention, the saw-tooth configuration on the clamping band projection is eliminated and the projection is alternatively provided with a plurality of openings arranged at circumferentially spaced intervals along said projection. The sidewalls of the clamping band arranged on either side of the slot provided at the opposite end of the clamping band are provided with a plurality of openings arranged at spaced circumferential intervals along said sidewalls, selected openings along one side wall being coaxially aligned with associated openings of the other sidewall.

To mount the clamping band, the projection is placed in the slot, the clamping band is positioned along the interior surface of the gasket to be clamped into position within a manhole opening and the clamping band is expanded with selected ones of the openings in the sidewalls being aligned with at least one or two of the openings in the projection. Tapered drive pins are inserted in the coaligned openings of the side walls and projection to securely maintain the clamping band in its expanded condition firmly water-tightly clamping the gasket against the opening in the manhole base.

The structural strength of the clamping band is enhanced by providing a steel band having a channel shaped cross-section and extending the length of the clamping band, the portion of the steel band extending through the clamping band projection having a channel-shaped cross-section of reduced width. The sidewalls of the channel-shaped steel band near the ends of the reinforcement band are provided with openings coaligned with the openings in said projection and in the sidewalls on either side of the slot.

The distinct and in fact significant advantage of the present invention resides in the fact that the clamping band need not be critically sized and will in fact readily and easily provide an excellent fluid-tight seal between gasket and manhole opening even in situations where the diameter of the opening differs significantly from the nominal diameter. In addition, the clamping band is easily removed (without destruction) by removing the wedge member (or drive pins) and is thus reusable.

OBJECTS OF THE INVENTION AND BRIEF DESCRIPTION OF THE FIGURES

It is therefore one object of the present invention to provide a novel clamping band having a design which permits the clamping band to accomodate the mounting of gaskets in openings which differ significantly from a nominal or expected diameter.

Still another object of the present invention is to provide a novel clamping band for use in gasket assemblies and the like wherein the clamping band is provided with a projection slidably mounted within a slot and which is adapted to receive a wedge for insertion into a groove or grooves provided in said projection for locking the clamping band into the desired position to thereby retain the gasket under the desired compression.

Another object of the present invention is to provide a novel clamping band for use in gasket assemblies and the like wherein the clamping band is provided with a projection slidably mounted within a slot which projection is adapted to receive a pin for insertion into coaligned openings in said projection and the sidewalls bordering the slot and arranged at the opposite end of the clamping band for locking the clamping band into the desired position.

Still another object of the present invention is to provide a clamping band of the type described having novel reinforcement means for enhancing the structural strength of the clamping band.

Still another object of the present invention is to provide a novel method for installing gaskets in manhole openings and the like wherein a gasket clamping band having a projection slidably received with a cooperating slot is expanded to exert the desired compression upon the resilient gasket, and a wedge is inserted into a cooperating opening communicating with said slot so that engaging surfaces of the projection and the wedge which conform to one another inter-engage and thereby lock the clamping band into the desired position, the design enabling the expansion of the clamping band to take place over a large circumferential range in order to permit the fluid-tight clamping of gaskets in manhole openings whose diameters significantly depart from a nominal or expected value.

Still another object of the present invention is to provide a novel method for installing gaskets in manhole openings and the like wherein a gasket clamping band having a projection slidably received with a cooperating slot is expanded to exert the desired compression upon the resilient gasket, and a pin is inserted into a cooperating opening communicating with said slot so that the pin enters the cooperating openings in the ends of the clamping band and thereby locks the clamping band into the desired position, the design enabling the expansion of the clamping band to take place over a large circumferential range in order to permit the fluid-tight clamping of gaskets in manhole openings whose diameters significantly depart from a nominal or expected value.

The above as well as other objects of the present invention will become apparent when reading the accompanying description and drawing in which:

FIG. 8a shows a top view, partially sectionalized, of still another clamping band embodiment of the present invention with certain elements thereof shown exploded to simplify an understanding thereof.

FIG. 8b shows a sectional view of the clamping band shown in FIG. 8a.

FIGS. 9a and 9b show sectional perspective views of the reinforcement band employed in the clamping band of FIG. 8a.

FIG. 10a shows a sectional view looking in the direction of arrows 10a—10a, of FIG. 8a.

FIG. 10b shows a sectional view looking in the direction of arrows 10b—10b, of FIG. 8a.

DETAILED DESCRIPTION OF THE INVENTION

Figure 4:
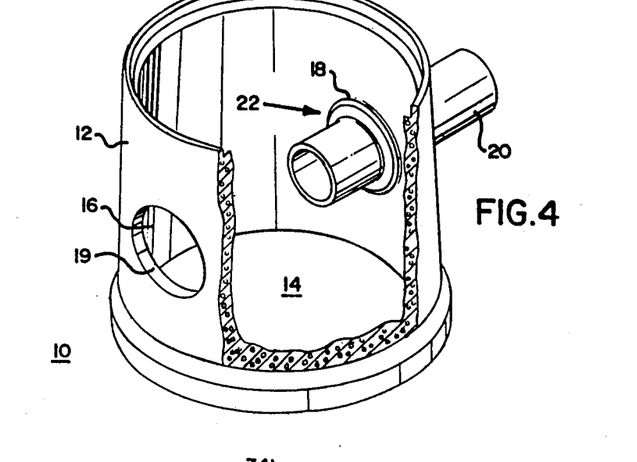
FIG. 4 shows a perspective view of a gasket assembly arranged within a manhole base, said gasket assembly being of the type capable of employing the clamping band of the present invention to great advantage.
Figure 4A:
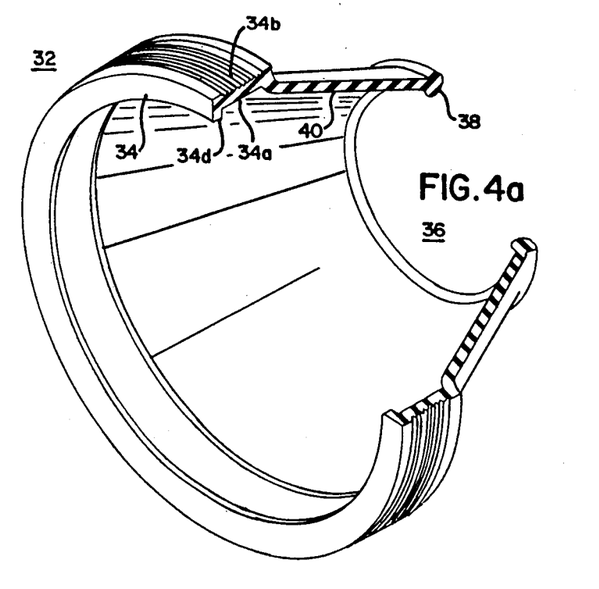
FIG. 4a shows a perspective view, partially sectionalized, of the gasket employed in the assembly of FIG. 1.

FIG. 4 shows a manhole base 10 having cylindrical shaped sidewall 12 integral with and extending upwardly from floor 14. A pair of openings 16, 18 are formed in sidewall 12 either by a casting or a coring operation and each being adapted to receive a pipe section such as shown at 20. The manhole base forms part of a manhole assembly which provides relatively easy access to the sewer system, as is conventional. A gasket assembly 22 provides a fluid-tight seal between the manhole base and pipe 20 and is sufficiently flexible to compensate for deviations from concentricity of pipe 20 relative to opening 18 due to vibration, settling, eccentricities in both the opening 18 and pipe 20, and so forth. The gasket assembly 22 comprises a gasket 30 and a clamping band 46 mounted within manhole opening 18 as will be described in detail hereinbelow. FIG. 4a shows a partially sectionalized perspective view of the gasket 32 which is comprised of annular flange 34 defining an opening of a larger diameter and being coupled to a truncated conical-shaped portion 40 which terminates in an enlarged beaded periphery 38, generally resembling an 0-ring, of smaller diameter than flange 34.

Figure 4B:
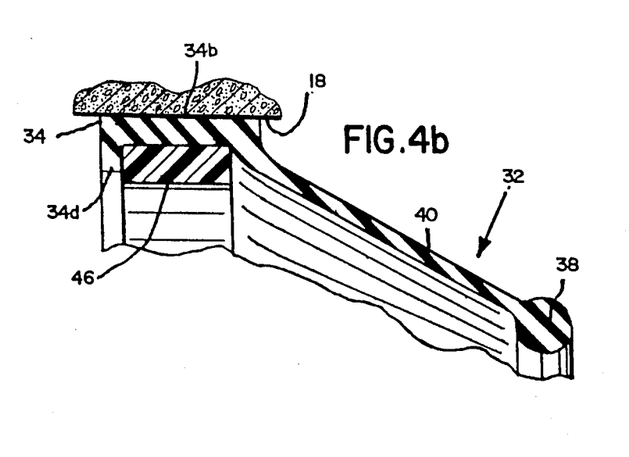
FIG. 4b shows the gasket of FIG. 4 with the clamping band in the operative position.

Flange 34 preferably has a band supporting surface or recess 34a as shown in FIG. 4b and an outer periphery comprised of a plurality of V-shaped projections 34b cooperatively defining recesses 34c enabling the projections 34b to be pressed laterally and downwardly against the main body of flange 34.

The compression band 46 comprises a substantially circular-shaped band formed of suitable plastic material such as polyvinylchloride (PVC). FIG. 4b shows a simplified cross-section of the clamping band 46 which is shown in greater detail in FIGS. 1 and 1a and is a substantially ringed-shaped member having a substantially uniform cross-section over the major portion of its circumference. The inner, concave surface 46a is provided with a pair of projections P1 and P2 each having a diagonally aligned surface 46b, 46b (i.e. a surface which extends diagonally inward from surface 46a), and a perpendicularly aligned surface 46c, 46c, i.e. a surface which extends inwardly and at a right angle to a tangent to surface 46a. The surfaces 46c, 46c act as shoulders which cooperate with an expander assembly 48 shown in schematic fashion in FIG. 1b for the purpose of expanding the diameter and hence circumference of the clamping band 46 in a manner to be fully described herein.

Figure 1:
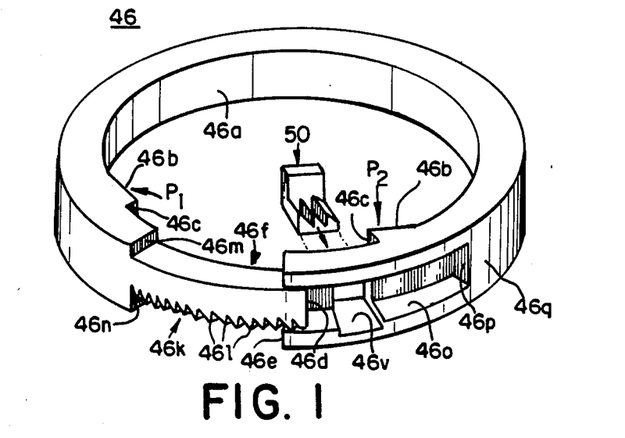
FIG. 1 shows a perspective view of a clamping band embodying the principles of the present invention.
Figure 1A:
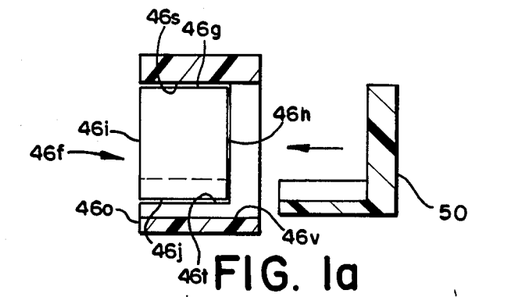
FIG. 1a is a sectional view of the band of FIG. 1 in the assembled position.

Clamping band 46 is provided with a discontinuity defining ends 46d, 46e. An enlongated curved projection 46f extends a predetermined distance inward from end 46d and has a cross-sectional area which is of reduced size compared with the nominal cross-sectional area of clamping band 46.

Three surfaces 46g, 46h and 46i of projection 46f are smooth while remaining surface 46j is provided with a series of projections forming a sawtooth-like pattern 46k defined a plurality of teeth 46l, each tooth have a diagonally aligned surface and a vertically aligned surface relative to the orientation of the clamping band shown in FIG. 1.

The inner end of projection 46f terminates at and is integral with the adjacent portion of clamping band 46 to define a pair of shoulders 46m, 46n.

Clamping band 46 is provided with an elongated curved slot 46o extending inwardly a predetermined distance from end 46e and terminating in a vertically aligned surface 46p. Elongated slot 46o is open, i.e. communicates with the outer peripheral surface 46q of band 46 and is defined by three smooth sidewalls namely base portion 46r and upper and lower sidewalls 46s and 46t shown in dotted fashion in FIG. 1b which shows projection 46f in solid line fashion and the end containing slot 46o partially sectionalized to facilitate an understanding of the cooperating projection 46f and slot 46o.

The slot 46o is further provided with an opening 46u communicating with the inner periphery 46a of clamping band 46 and with the base 46r of slot 46o. The lower portion of opening 46u also extends into sidewall 46t forming a square-shaped recess 46v therein.

Figure 2:
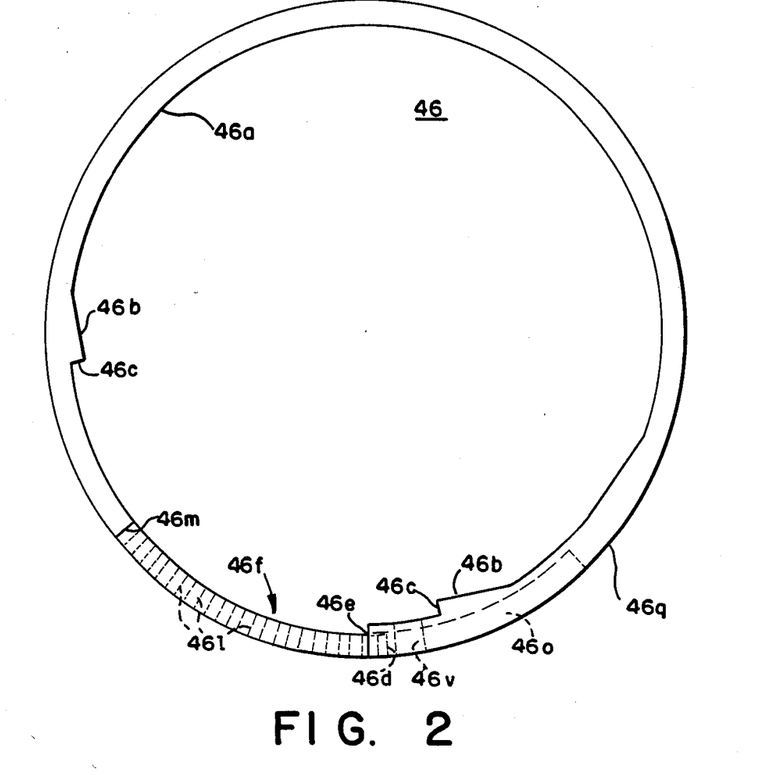
FIG. 2 shows a top plan view of the clamping band of FIG. 1.

The opening 46u receives a wedge 50 shown in FIGS. 1 and 2, said wedge being comprised of a body portion 50a having a projection 50b extending from its lower end relative to FIG. 2 and having teeth 50c formed in one surface of the body portion thereof, each of said teeth having a diagonally aligned surface 50d and a vertically aligned surface 50e. Wedge 50 is inserted into opening 46u in clamping band 46 in order to lock the clamping band into the desired clamping position as will be more fully described hereinbelow.

The gasket 32 and clamping band 46 are inserted in the following manner:

The gasket is positioned within the manhole base opening 18 in the manner shown best in FIG. 4b with the serrated surface comprised of projections 34b engaging the opening. The clamping band is arranged with the projection 46f telescoped within the elongated slot 46o. The ends of the clamping band are moved relative to one another so that end 46d, for example, is brought either into engagement with end wall 46p of slot of 46o or is moved sufficiently close to end wall 46p so as to reduce the diameter and thus the circumference of the clamping band 46 sufficiently to permit its easy insertion and proper alignment within recess 34a of gasket 34. Similarly, the end 46e of the clamping band 46 is brought either into engagement with or in close proximity to shoulders 46m and 46n simultaneously with the movement of end 46d toward the end wall 46p.

Figure 1B:
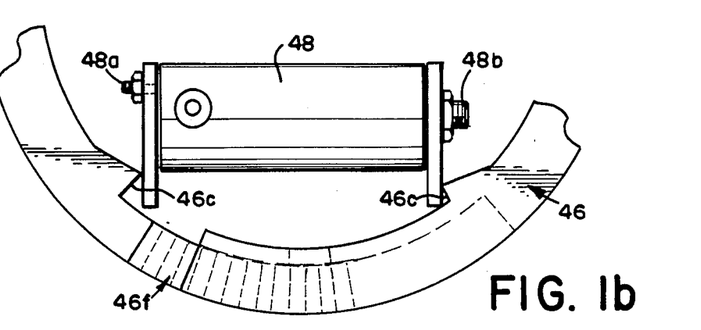
FIG. 1b is a sectional view of the clamping band of FIG. 1 showing the manner in which the band is expanded by hydraulic means.
Figure 3:
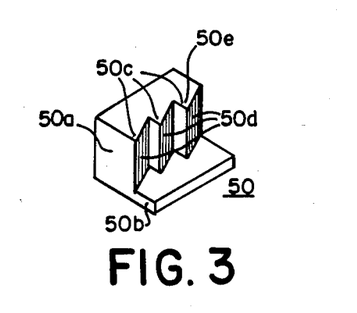
FIG. 3 shows a perspective view of a wedge employed with the expandable clamping band of FIGS. 1 and 2.

With the clamping band in the proper position, the expander assembly 48 is placed within the inner periphery of clamping band 46 so that its projections 48a and 48b respectively engage associated shoulders 46c, 46c in the manner shown. Projections 48a, 48b are movable relative to one another, expander 48 being of a cylinder type having a piston (not shown) whose piston rod is coupled to one of said projections 48a, 48b and is moved when a fluid is introduced into cylinder 48 under pressure. The expander is preferably a hydraulic type which may be operated by a manually operated jack such as, for example, that shown in FIG. 3 of the aforementioned copending application Ser. No. 778,690, incorporated herein by reference thereto. The hydraulic fluid introduced into the expander moves projections 48a and 48b apart causing expanding forces to be applied to clamping band 46 through shoulders 46c, 46c whereupon the clamping band has its diameter and circumference expanded. The clamping band expands into the flange 34a of gasket of 32 causing the flange to be expanded outwardly to engage opening 18 and thereupon to be compressed between opening 18 and the outer periphery 46q of clamping band 46. The desired compression is obtained by reading gage 54. When the desired pressure level is reached, the hydraulic pressure source is maintained in this condition and wedge 50 is inserted into opening 46u so that the teeth 50c of wedge 50 are inter-engaged with selected ones of the teeth 46l in the adjacent surface of projection 46f. Wedge 50 snuggly fits into opening 46u and is firmly tapped into the wedging position to maintain the clamping band in the locking position and prevent release of the wedge 50 from the locked position in the opening 46u of clamping band 46.

The significant advantages of the clamping band described hereinabove resides in its ease of installation and further that the clamping band need not be accurately and precisely sized prior to its insertion and movement to the clamped and locked position as is required with plastic clamping bands of the type described in the aforementioned copending application Ser. No. 778,690 and U.S. Pat. No. 4,387,900. The plastic clamping band described herein has distinct advantages over metallic clamping bands which, although made of stainless steel, have nevertheless been found to deteriorate due to the strong toxic and acidic influences found in manhole assemblies and which influences are greatly accelerated by significant changes in temperature. Such stainless steel clamping band, although normally capable of withstanding such deteriorating influences, nevertheless have been found to corrode due to the even the slightest imperfections in their surface finsh typically encountered during production even though exacting production techniques are employed to prevent the occurrence of such imperfections. No such problems are encountered in the fabrication of the plastic clamping bands of the present invention.

In addition, the clamping band of the present invention is readily removable and is reusable as compared with metallic clamping bands, which, although removable, are not capable of being reused due to the fact that the removal operation disfigures and otherwise alters the shape of the metal clamping band to a degree sufficient to prevent reuse.

The clamping band of the present invention may be removed by replacing the expander assembly 48 into the operative position as shown in FIG. 1b; applying the hydraulic pressure which was originally applied to the clamping band during the insertion operation; and prying the wedge 50 from opening 46u in the clamping band. The hydraulic pressure is then preferably slowly released, enabling the resilient gasket to expand to its normally relaxed position, thus contracting or reducing the diameter and circumference of the clamping band sufficiently to facilitate removal of the clamping band from the interior of the gasket flange.

The wedge 50 is preferably formed of a plastic material which is at least as inherently strong as the plastic material used to form the clamping and preferably has a structural strength which is at least equal to or greater than the clamping band. Alternatively, the wedge may be formed of a suitable highly anticorrosive metal such as stainless steel.

It can thus be seen from the foregoing description, that the clamping band of the present invention has a design which greatly facilitates the use of the clamping band for installations in which the openings in which the gaskets are mounted very significantly in diameter while enabling the clamping band to be formed without great concern for the sizing thereof, the only requisite being that the teeth of the clamping band projection 46f bridge opening 46u to engage all of the teeth 50c of wedge 50.

Figure 5:
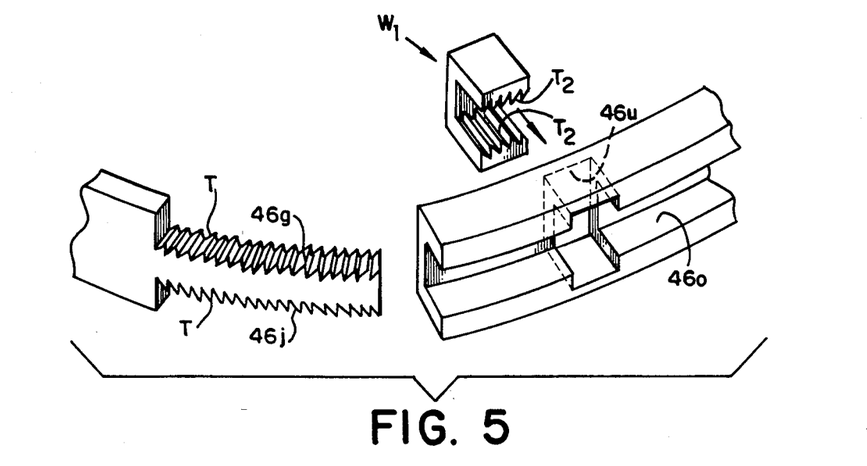
FIGS. 5 through 7 show still other preferred embodiments of the present invention.

The embodiment of FIGS. 1-4 may be modified in the following manner:

For example, the clamping band may be modified to provide teeth T on both opposing surfaces 46g and 46j to receive either a pair of wedges or a substantially U-shaped wedge $W_1$ having a pair of teeth $T_2$, $T_2$ cooperating with the sets of teeth on projection 46f, as shown in FIG. 5, and inserted into an opening 46u in the band. Alternatively, the teeth may be of a different configuration or the surfaces of the teeth may be different angular orientation, without departing from the spirit and intent of the present invention. As another example, as shown in FIG. 6, the slot 46o' in clamping band 46 may receive a bifurcated projection 46f' with a pair of teeth 46j', 46j' wherein a wedge $W_2$ is inserted within an opening 46u' and is provided with teeth $T_3$, $T_3$ on opposite surfaces thereof and inter-engaging with the sets of teeth 46j' and 46j', wedge $W_2$ being inserted into the sidewall of the clamping band.

Figures 6, 7:
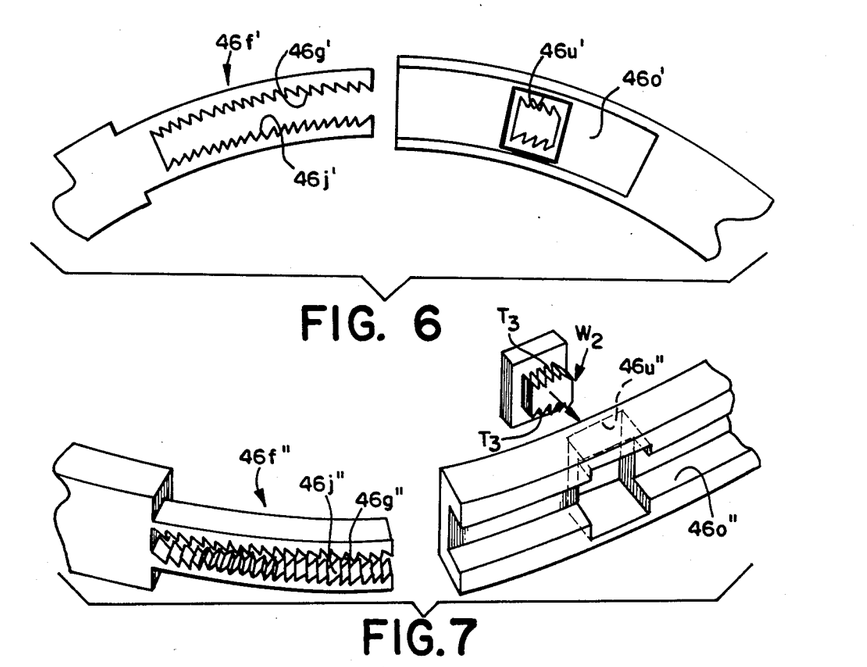

FIG. 7 shows a similar arrangement wherein the bifurcated sets of teeth 46j'', 46j'' receive wedge $W_3$ which is inserted through an opening provided along the interior periphery of the clamping band.

FIGS. 8a through 10b show still another preferred embodiment of the present invention in which the clamping band 60, only a portion of which is shown in the Figures. for purposes of simplification, is comprised of an end 60a having a projection 61 and an opposite end 60b having a slot 62 (the central portion of the clamping band having been omitted). The projection 61 is of reduced width as compared with the remainder of the clamping band and is just slightly less in width than the width of the slot 62 in order to be slidably received by the slot. The thickness T1 of the projection 61 is preferably slightly less than the thickness T2 of the major portion of the clamping band in order that the convex outer peripheral surface 61a of the projection be substantially flush with the convex outer peripheral surface of the side walls 63 and 64 embracing slot 62 as well as being substantially flush with the portion 65 of the clamping band extending inwardly from the end 60b of the clamping band provided with slot 62. The thickness of projection 61 also permits the projection to slidably fit between the base of the slot 62 and the central protion 71 of the reinforcing band 66 to be more fully described.

Figures 8A, 8B, 9A, 9B:
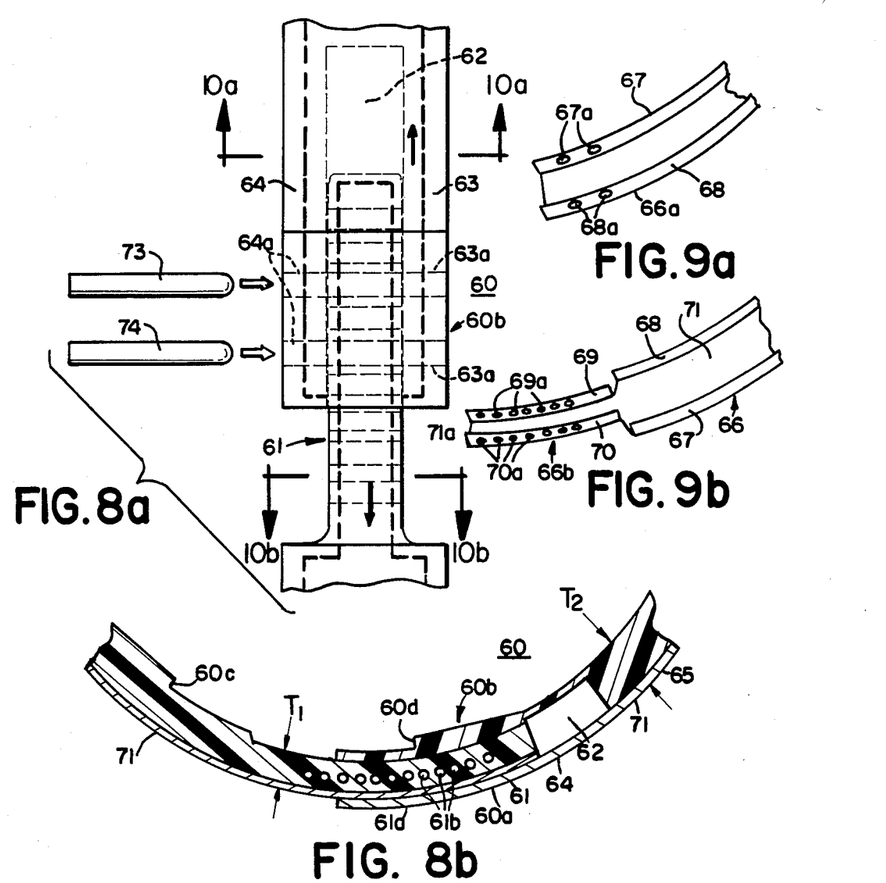

Projection 61 is provided with a plurality of spaced, parallel openings 61b. Side walls 63 and 64 are each provided with a plurality of openings 63a, 64a arranged in spaced, parallel fashion such that openings 63a are each co-axially aligned with an associated one of the openings 64a and further so that the spacing between adjacent openings 63a and 64a is substantially equal to the spacing between adjacent openings 61b in projection 61. The diameters of the openings 61b, 63a and 64a are also preferably equal.

The clamping band 60 is provided with a reinforcing structure comprised of a steel band 66 having a channel shaped cross-sectional configuration. The end 66a of the reinforcing band 66 is provided with openings 67a, 68a in the side walls 67 and 68. In order to properly structurally reinforce projection 61, the opposite end 66b of reinforcement band 66 is provided with a channel-shaped portion of reduced width as defined by sidewall portions 69 and 70 each provided with openings 69a, 70a. Openings 67a are co-aligned with openings 68a and likewise openings 70a are co-aligned with openings 69a which in turn, are co-aligned with the openings in the gasket material which is preferably formed of a suitable plastic and may be formed of any of the plastic materials described hereinabove.

Figure 10A:
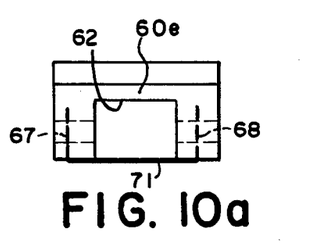

FIGS. 8b and 10a show the manner in which the reinforcement band is arranged within the clamping band 60 such that the central portion 71 of the clamping band acts as a cover over slot 62 while its side walls 67 and 68 are embedded in the plastic material.

Figure 10B:
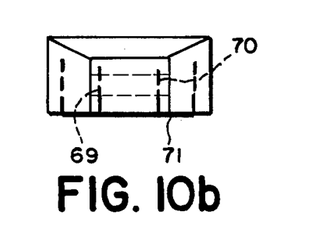

FIG. 10b shows the manner in which the steel band is arranged within both ends of the clamping band when the clamping band is in the assembled condition, the portion of reduced diameter having the central portion 70a slidably engaging the central portion 71, and the side-walls 69 and 70 being embedded within the projection 61.

The manner in which the clamping band embodiment shown in FIGS. 8a through 10b is installed is quite similar to that described hereinabove in that the projection 61 is placed within slot 62 and reduced to a diameter sufficient to place the clamping band against the flange of the gasket. The expanding assembly is placed within the clamping band so that the edges 101a and 100a (see FIG. 1b) engage the shoulders 60c, 60d of the clamping band as shown in FIG. 8b. The expanding assembly then expands the clamping band to press it firmly into the gasket to cause the gasket to experience both expansion and compression in order to provide an adequate water-tight seal between the gasket and the manhole opening. The gauge referred to hereinabove is examined to determine that the clamping band has been expanded to exert the proper force upon the gasket. The clamping band is expanded, however, by an amount sufficient to bring at least two of the openings 61b in projection 61 into alignment with the openings 63a and 64a in the side walls 63 and 64 of the clamping band. With this alignment being provided, the tapered drive pins 73, 74 are forcibly inserted into the aforementioned co-aligned openings to maintain the clamping band in its expanded condition.

The exposed portion 71 of the band 66 is firmly pressed against and is in intimate contact with the adjacent suface 34a of gasket 32 (see FIG. 4a). Thus, band 66 is protected from exposure to corrosive influences which may be present within the manhole assembly. As an alternative arrangement, band 66 may be inverted from the arrangement shown in FIG. 10a so that central portion 66 is embedded in the body portion 60e with the sidewalls 67, 68 of band 66 being embedded in the sidewalls of the clamping band 60 on opposite sides of slot 62, if desired.

As was described hereinabove with regard to previously embodiments, the tapered pins may be removed by reinserting the expander assembly and applying the proper hydraulic pressure and thereafter removing the drive pins 73, 74 by forcibly inserting slightly smaller pins into the openings to expose a sufficient length of the pins 73 and 74 to enable the pins to be pulled out of the openings. With the pins fully removed from the clamping band, pressure is gradually released from the expander assembly whereupon the expander assembly, clamping band and, if desired, the gasket, may be removed and replaced.

If desired, the reinforcement structure employed in the embodiment of FIGS. 8a through 10b may be utilized in the embodiments previously described.

A latitude of modification change and substitution is intended in the foregoing disclosure, and in some instances, some features of the invention will be employed without a corresponding use of other features. Accordingly it is appropriate that the appended claims be construed broadly and in a manner consistent with the spirit and scope of the invention here.

What is claimed is:

1. A clamping apparatus including a clamping band for clamping a gasket against an opening in a sidewall so as to form a fluid-tight seal between said gasket and said sidewall, said clamping band comprising:
   a substantially annular-shaped member having a discontinuity so as to define first and second ends thereof;
   one of said ends having a reduced cross section relative to the nominal cross section of said clamping band;
   said opposite end having an elongated slot for slidably receiving said projection;
   first locking means provided along at least one surface of said projection;
   an opening provided in said clamping band and communicating with said elongated slot;
   second locking means insertable through said opening and cooperating with said first locking means when positioned in said opening to lock said projection in said slot to prevent displacement of said clamping band from its annular dimension.

2. The clamping apparatus of claim 1 wherein said first locking means comprises a plurality of teeth having a substantially sawtooth pattern arranged along one surface of said projection.

3. The clamping apparatus of claim 2 wherein said second locking means comprises a member having at least one surface with a surface pattern having discontinuities and conforming to the surface pattern of said first locking means surface so that the surface patterns of said first and second locking means are inter-engaged when said locking means is inserted in said opening to thereby lock said projection relative to said slot and prevent relative movement therebetween.

4. The clamping apparatus of claim 1 wherein in said clamping band is further provided with a pair of projections each arranged along one surface of said clamping band a spaced distance inwardly from the first and second ends of said clamping band and adapted to receive the operating members of an expander assembly for expanding the clamping band to a locked position.

5. The clamping apparatus of claim 1 wherein said elongated slot communicates over substantially its entire length with the outer periphery of said clamping band.

6. The clamping apparatus of claim 1 wherein the inner end of the said projection is integral with the immediately adjacent portion of the clamping band and cooperates with the immediately adjacent portion of the clamping band to define a shoulder for limiting relative movement of the ends of the clamping band when engaging the other end of said clamping band having said elongated slot.

7. A method for installing a gasket assembly within an opening of a sidewall, said gasket assembly comprising a gasket having a flange and a clamping band whose free ends respectively comprise a projection having a cross section of reduced size as compared with the nominal cross section of said clamping band and an elongated slot for freely slidably receiving said projection and having an opening communicating with said slot, said projection having locking means along at least one surface thereof, said method comprising the steps of:
   placing said flange against the surface of said opening so that the outer periphery of said flange is adapted to engage the surface of said opening;
   placing said clamping band projection into said slot;
   arranging said clamping band so that its outer periphery engages the inner periphery of the gasket flange positioned within said opening;
   expanding the circumference of said clamping band by the application of force to the inner periphery thereof until the flange of the resilient gasket is compressed to a desired amount;
   providing a second locking means having a locking surface which inter-engages with a locking surface of said first locking means and inserting said second locking means into said opening to place the surfaces of said first and second locking means into engagement with one another whereby the gasket is maintained under the desired compression between said sidewall opening and said clamping band; and relieving the expansion pressure from said clamping band.

8. The method of claim 7 further comprising the steps of tapping the second locking means firmly into position to assure intimate inter-engagement between said first and second locking means.

9. The method of claim 8 wherein the clamping band may be removed by performing the following steps including;

applying an expansion force to the interior surface of said clamping band, said expanding force being substantially equal to the expanding force originally applied to said clamping band during the installation thereof;

prying said second locking means from said clamping band opening; and slowly relieving the expansion force from said clamping band to enable said clamping band to safely reduce its circumference for removal from said flange.

10. The clamping apparatus of claim 1 wherein the locking means provided in said projection comprises a plurality of openings circumferentially spaced along the projection.

11. The apparatus of claim 10 wherein said elongated slot defines a pair of side walls on either side of said slot; said opening being provided in said side walls.

12. The apparatus of claim 10 wherein said second locking means comprises a pin insertable through co-aligned openings in said projection and said side walls.

13. The apparatus of claim 10 wherein said side walls are provided with a plurality of openings circumferentially spaced along said side walls;

said second locking means comprising a plurality of pins insertable into co-aligned openings in said side wall and said projection.

14. The clamping apparatus of claim 1 wherein said clamping band is formed of a suitable plastic material;

said clamping band having a metallic reinforcing band embedded therein.

15. The clamping apparatus of claim 14 wherein said metallic reinforcing band has a substantially channel-shaped cross-section defined by a central portion and an integral pair of flanges on either side of said central portion.

16. The clamping apparatus of claim 15 wherein the channel-shaped cross-section has a first width extending along the major portion of said clamping band and a second reduced width extending along the portion of said reinforcing band which is embedded in said projection.

17. The clamping apparatus of claim 16 wherein the flanges embedded in said projection are provided with openings co-aligned with said opening in said clamping band.

18. The clamping apparatus of claim 17 wherein the portion of the reinforcing band adjacent said slot in said clamping band has its flanges provided with openings co-aligned with said openings for receiving said second locking means.

19. The apparatus of claim 10 wherein said locking means comprises a tapered pin.

20. The apparatus of claim 15 wherein the central portion of said steel band arranged in said clamping band at the end opposite said projection overlies said elongated slot and cooperates with said slot to form a substantially enclosed space for slidably receiving said projection.

21. A method for installing a gasket assembly within an opening of a sidewall, said gasket assembly comprising a gasket having a flange and a clamping band whose free ends respectively comprise a projection having a cross section of reduced size as compared with the nominal cross section of said clamping band and an elongated slot for freely slidably receiving said projection and having an opening communicating with said slot, said projection having locking means along at least one surface thereof, said method comprising the steps of:

placing said flange against the surface of said opening so that the outer periphery of said flange is adapted to engage the surface of said opening;

placing said clamping band projection into said slot;

arranging said clamping band so that its outer periphery engages the inner periphery of the gasket flange positioned within said opening;

expanding the circumference of said clamping band by the application of force to the inner periphery thereof until the flange of the resilient gasket is compressed to a desired amount;

providing a second locking means and inserting said second locking means through said opening and said first mentioned locking means whereby the gasket is maintained under the desired compression between said sidewall opening and said clamping band; and relieving the expansion pressure from said clamping band.

22. The method of claim 21 wherein the steps of providing a said second locking means further includes providing at least two such second locking means and providing a plurality of openings communicating with said slot wherein said plurality of second locking means are inserted into selected openings adjacent said slot which are co-aligned with said first mentioned locking means.

23. The method of claim 21 further comprising the step of reinforcing the clamping band by providing a metallic reinforcing band and embedding said reinforcing band in said clamping band.

24. The method of claim 21 wherein the step of providing said clamping band further includes providing notches along the interior concave periphery of said clamping band and placing projections provided on the expansion means in contact with said notches; and operating said expansion means whereby the projections thereof move apart to expand the clamping band.

* * * * *